United States Patent [19]

Bombardier

[11] 3,993,347

[45] Nov. 23, 1976

[54] WINDSHIELD MOUNTING

[75] Inventor: Jerome Bombardier, Valcourt, Canada

[73] Assignee: Bombardier Limited, Valcourt, Canada

[22] Filed: Mar. 21, 1975

[21] Appl. No.: 560,796

[30] Foreign Application Priority Data
Oct. 8, 1974  Canada ............................... 210954

[52] U.S. Cl. ............................... 296/90; 180/5 R; 296/84 R
[51] Int. Cl.[2] .......................................... B60J 1/02
[58] Field of Search ............ 160/19, 368 R; 49/463, 49/465; 211/10, 11, 184; 85/5 R; 24/201 TR, 201 S, 230 F; 403/252; 296/84 R, 84 A, 84 K, 89, 90; 180/5 R

[56] References Cited
UNITED STATES PATENTS

| | | | |
|---|---|---|---|
| 2,537,786 | 1/1951 | Poupitch | 85/5 R |
| 2,584,813 | 2/1952 | Poupitch | 85/5 R |
| 3,637,254 | 1/1972 | Lapointe et al. | 296/84 A |
| 3,819,226 | 6/1974 | Sykora | 296/90 |

FOREIGN PATENTS OR APPLICATIONS

| | | | |
|---|---|---|---|
| 328,617 | 4/1930 | United Kingdom | 52/484 |

*Primary Examiner*—Roy D. Frazier
*Assistant Examiner*—William E. Lyddane

[57] ABSTRACT

A snowmobile windshield comprises a moulded sheet of transparent polycarbonate material having a series of mounting tabs spaced along its lower edge. The mounting tabs are of resilient form, being integral with the windshield and generally flat, but having laterally extending parts which can be compressed together to allow the tab to pass into engagement with a narrow mounting slot in the cab of the snowmobile. The windshield can be installed without requiring access to the underside of the snowmobile cab, and in accident conditions can yield by releasing the tabs from their mounting slots, thereby reducing the likelihood of facial injuries to the snowmobile driver.

8 Claims, 5 Drawing Figures

WINDSHIELD MOUNTING

FIELD OF THE INVENTION

This invention relates to improvements in windshields for recreational vehicles, and in particular, although not exclusively, to an improved mounting arrangement for the windshield of a snowmobile.

SUMMARY OF THE INVENTION

According to the invention there is provided a windshield for a recreational vehicle, comprising a moulded sheet of transparent plastics material, said windshield having a central section integral with two curved rearwardly extending side sections, having a lower edge for engagement on a body portion of the vehicle, and attachment means on said lower edge to form a releasable connection of the windshield on the vehicle, said attachment means comprising a number of tabs spaced at intervals along, and extending downwardly from, said lower edge, each tab being of generally flat form substantially co-planar with the area of the windshield adjacent thereto, said tab being of resilient material and having a laterally extended portion spaced from and extending parallel to the lower edge of th windshield, the arrangement being such that said laterally extended portion can be resiliently compressed to pass through a narrow mounting slot in the vehicle, and having passed through the slot can return to its extended condition to form a releasable connection between the windshield and the mounting slot.

A snowmobile windshield preferably is fabricated from sheet polycarbonate material, the mounting tabs being integral with the windshield and each comprising two parts bowed outwardly to opposite side of the plane of the tab, these outwardly bowed parts being resiliently compressible to permit the tabs to pass through the mounting slots. Such a windshield can be mounted without requiring access to the underside of the part of the vehicle in which the mounting slots are provided. Furthermore, under impact load, should the driver of the snowmobile be thrown against the windshield, the tabs can readily be pulled out of their mounting slots. Thus the windshield can yield thereby reducing the likelihood of the driver receiving facial injuries in a collision.

The invention will further be described, by way of example only, with reference to the accompany drawings, wherein:

DESCRIPTION OF THE PREFERRED EMBODIMENT

Figure 1:
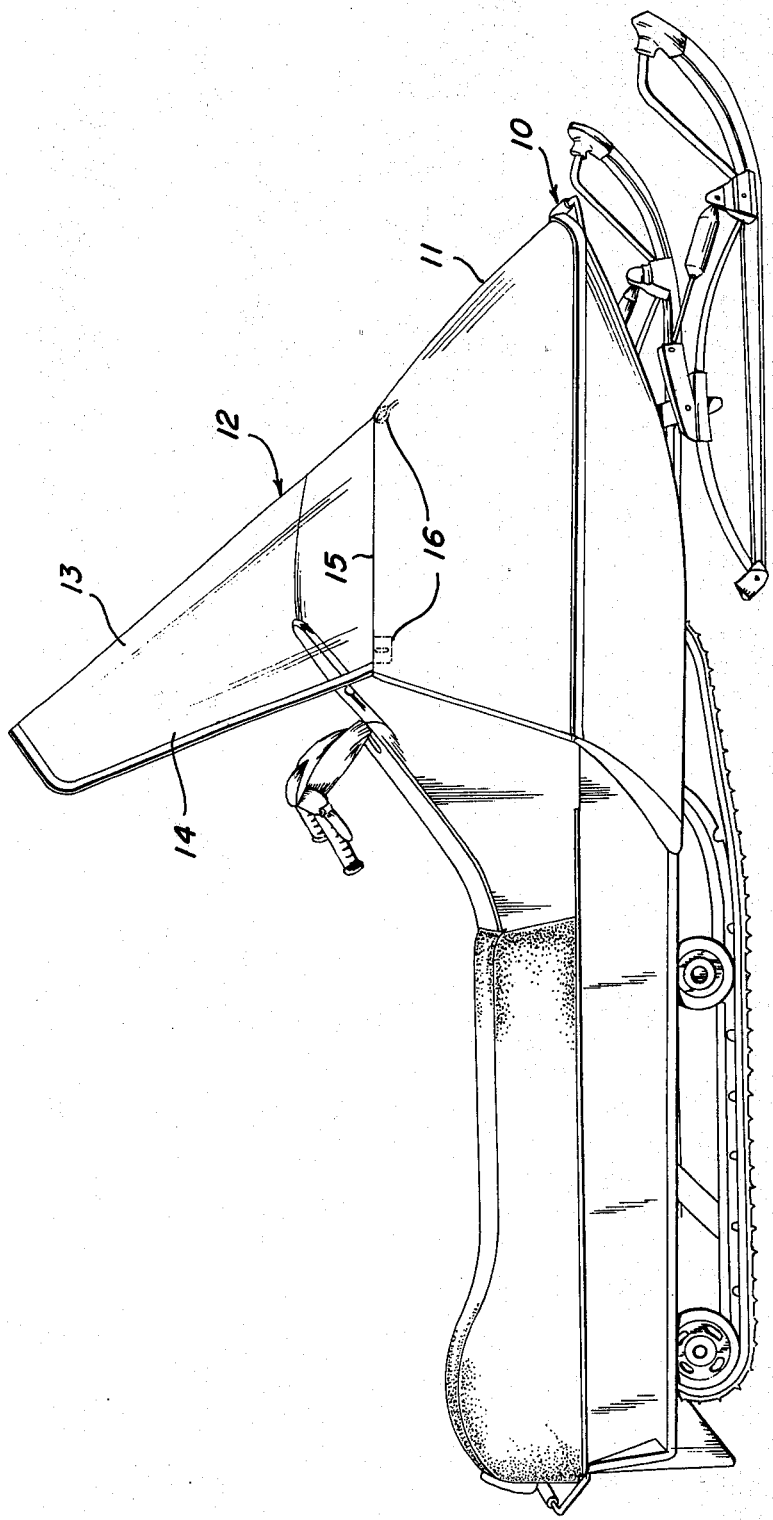
FIG. 1 is a side elevation of a snowmobile incorporating a windshield in accordance with the present invention.

The snowmobile 10 shown in FIG. 1 includes a cab portion 11 at the rear upper edge of which is mounted a windshield 12. The windshields may be moulded from polycarbonate or any suitable transparent plastics material. The example shown is moulded from polycarbonate sheet of a thickness of 0.080 inches and has an upwardly and rearwardly inclined transverse front portion 13 integral with rearwardly curved side portions 14. The windshield has a continuous horizontal lower edge 15 on which are provided a series of integral tabs 16 for securing the windshield to the snowmobile cab. Any suitable number of tabs may be provided, for example one at the bottom of each of the sides 14 of the windshield, and two or three spaced across the transverse front portion of the windshield.

Figure 2:
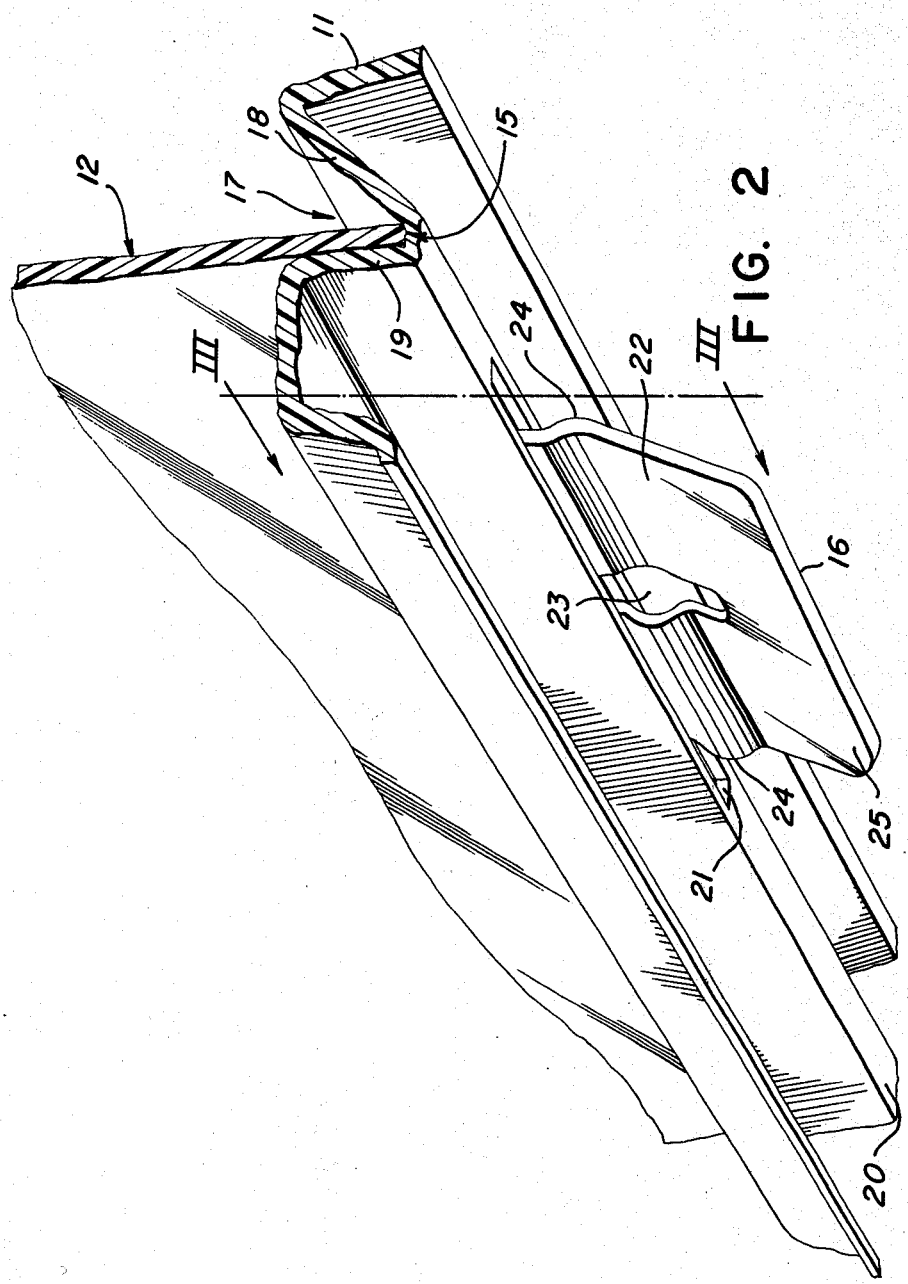
FIG. 2 is a fragmentary bottom perspective view illustrating a detail of the mounting of the windshield.

Referring to FIG. 2, it will be seen that the cab 11 of the snowmobile is formed with a continuous V-shaped groove 17 extending around its' rear upper edge to receive the lower edge of the windshield. The groove 17 is defined by a forwardly inclined surface 18, and a substantially upright surface 19 which meet in a narrow flat bottom wall 20. At intervals throughout the length of the wall 20 are provided narrow elongate slots 21 at locations corresponding to the locations of the tabs 16 on the windshield.

Figure 5:
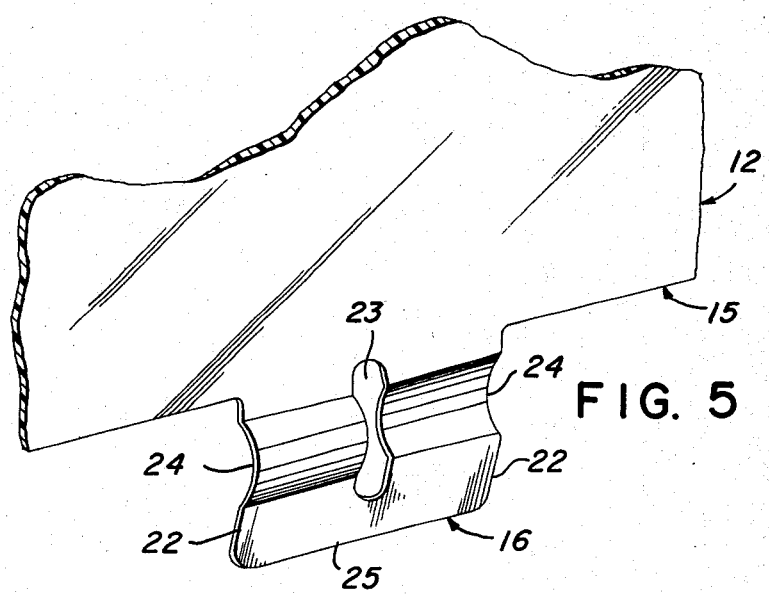
FIG. 5 is a fragmentary view showing the form of a windshield mounting tab.
Figure 3:
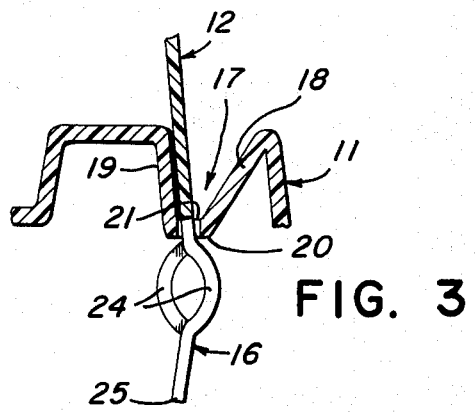
FIG. 3 is a sectional view taken on the line III—III of FIG. 2.
Figure 4:
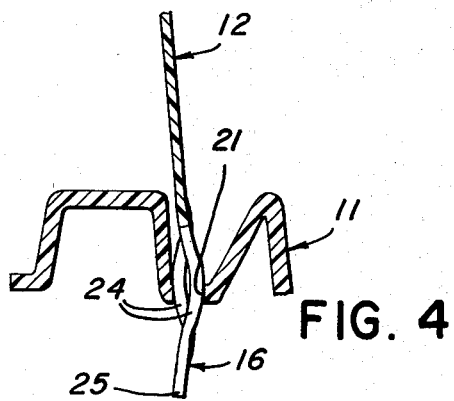
FIG. 4 is a view corresponding to FIG. 3 but showing the part in a different position.

Referring particularly to FIG. 5, it will be seen that each tab 16 is formed integrally with the windshield, and is generally of flat form, substantially co-planar with the adjacent portions of the windshield. The tab 16 is divided into two spaced portions 22 by a central vertical slot 23, these portions being laterally extended to opposite sides of the plane of the tab as is best seen in FIGS. 3 and 5. These laterally extended portions are provided by moulded arcuately curved projections 24 in each portion 22 of the tab. As will be seen in FIG. 3, the combined lateral width of the curved projections 24 is substantially greater than the width of the mounting slot 21 in the snowmobile cab 11. However the tabs are of resilient material, so that the curved projections 24 can be compressed towards one another as indicated in FIG. 4, to allow the tab 16 to be moved into engagement with the slot 21 in the snowmobile cab. Once the lateral projections 24 have moved completely through the slot, they may expand again to their unstressed condition as shown in FIG. 3, and thereby form a means to retain the windshield 12 upon the snowmobile cab 11.

It will be appreciated that in mounting the windshield to the cab, it is not necessary for the workman to have access to the underside of the cab, and installation may be performed solely by manipulation of the windshield from above the cab. It will be noted that each tab 16 has a thin flat bottom portion 25 which is narrower than the slot 22. Therefore upon installation, these bottom portions 25 are first aligned with and inserted in the corresponding slots 21, whereupon downward pressure exerted upon the windshield will cause each of the tabs to pass into the engaged position shown in FIG. 3. It will be appreciated that the curved configuration of the projections 24 of each tab facilitate the compression of the tab through cooperation with the edges of the slots 21 to allow the tab to move into the engaged position. Likewise, this curved configuration facilitates compression of the curved projections to allow the tab to be withdrawn from the mounting spot 21.

The configuration and relative dimensions of the slots 21 and the curved projections 24 of the tab are choosen to be such that under normal operating conditions, the tabs 16 provide for a secure retention of the windshield upon the rear upper portion of the snowmobile cab 11. However the tabs are designed to release from the slots 21 if an unexpected force is encountered, as by the bodyweight of a driver being thrown against the windshield in a front end collision. In these circumstances, the single tab 16 provided at the bottom of each side 14 of the windshield will quickly release from its slot in the cab, allowing the windshield to yield under the force applied to it, and thereby hopefully reducing the likelihood of facial injuries to the driver.

The tabs 16 provided across the bottom edge of the transverse front portion 13 of the windshield are substantially in transverse alignment. During collision these tabs may well retain their engagement with the cab, but form in effect a transverse hinge about which the entire windshield 12 can pivot forwardly.

What I claim as my invention is:

1. A windshield for a recreational vehicle, comprising a moulded sheet of transparent plastics material, said windshield having a central section integral with two curved rearwardly extending side sections, having a lower edge for engagement on a body portion of the vehicle, and attachment means on said lower edge to form a releasable connection of the windshield on the vehicle, said attachment means comprising a number of tabs spaced at intervals along, and extending downwardly from said lower edge, each tab being generally co-planar with the area of the windshield adjacent thereto, each said tab being of resilient material and having a first region of uniform thickness adjacent the lower edge of the windshield, an intermediate portion adjacent the first region wherein the tab is laterally extended to define a region the overall width of which is increased relative to said first region of uniform thickness, and a free end portion comprising a second region of uniform thickness beneath the intermediate portion, said first and second regions of uniform thickness being generally aligned with each other, first and second transition surfaces extending vertically of the tab at an angle to the plane thereof from opposite sides of said intermediate portion to each of said first and second regions respectively, the intermediate portion being itself resiliently compressible to a smaller overall width when urged through a slot narrower than said original overall width through interaction of the edges of the slot with said first or second transition surfaces respectively, and then returning to its extended condition when disengaged from the slot edges, to thereby form a releasable connection between the windshield and the mounting slot.

2. A windshield according to claim 1 wherein said tabs are formed integrally with the windshield.

3. A windshield according to claim 2 wherein the windshield is of polycarbonate.

4. A windshield according to claim 1, wherein one such tab is provided on said lower edge at the bottom of each rearwardly extending side section of the windshield, and at least two such tabs are spaced across the bottom of the central section of the windshield, said at least two such tabs being substantially transversely aligned.

5. A windshield according to claim 1 wherein each tab has a slot extending vertically to a lower portion of the windshield, parts of the tab on opposite sides of said slot being bowed laterally in opposite directions to the plane of the tab to define said intermediate portion and said first and second transition surfaces.

6. A windshield according to claim 1, fabricated in polycarbonate material and having said tabs formed integrally therewith, wherein each tab has a slot extending vertically, said intermediate portion being defined by parts of the tab on opposite sides of the slot which curve smoothly outwardly in opposite directions with respect to the plane of the tab.

7. A windshield according to claim 1, in combination with a said body portion of a snowmobile, which body portion has slots therein for said tabs, which slots are of a length greater than the horizontal length of the tabs and said slots having a width greater than the thickness of the uniform thickness first and third regions of the tab and less than the said overall width of the intermediate portion, said body portion including a space beneath the slot for the intermediate portion to relax after passage through the slot to its natural condition.

8. A windshield according to claim 1, said free end portion formed as one piece along the entire lower edge of each tab.

* * * * *